July 8, 1969   J. A. DONELAN ET AL   3,453,725

METHOD OF MAKING SUPERCONDUCTIVE CABLES

Filed Nov. 3, 1966

INVENTORS
JAMES ARTHUR DONELAN
MICHAEL WILLIAMS

BY Kinchilan, Lisschten & Ottinger

ATTORNEYS

United States Patent Office 3,453,725
Patented July 8, 1969

3,453,725
METHOD OF MAKING SUPERCONDUCTIVE CABLES
James Arthur Donelan, West Harrow, and Michael Williams, Watford, England, assignors to The General Electric Company Limited, London, England, a British company
Filed Nov. 3, 1966, Ser. No. 591,856
Claims priority, application Great Britain, Nov. 8, 1965, 47,236/65
Int. Cl. H01b 5/02
U.S. Cl. 29—599    9 Claims

ABSTRACT OF THE DISCLOSURE

A superconducting electric cable and a method of making the same wherein strips of metal having good electrical and thermal conductivities at low temperatures are pressure-welded together at their interfaces so as to sandwich between them wires of a hard superconductive material.

---

Figure 1:
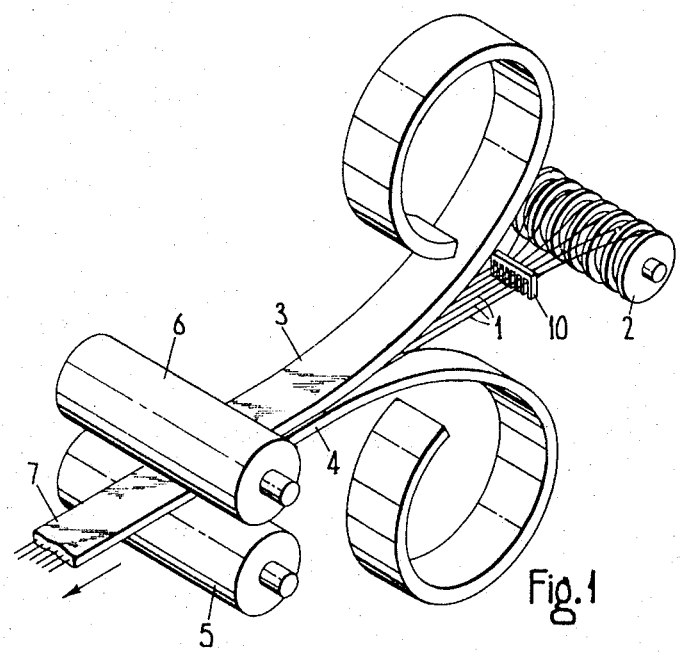

This invention relates to superconductive cables and the manufacture thereof.

By a superconductive cable is herein meant a cable carrying one or more electrical conductors (hereinafter referred to simply as wires) of superconductive material, that is to say material whose electrical resistance becomes effectively zero when the material is maintained at a sufficiently low temperature.

More particularly, although not exclusively, the invention is concerned with composite superconductive cables designed for carrying heavy electrical currents and suitable for winding superconductive solenoids for the generation of very high magnetic fields.

It is now well known that the performance of solenoids wound from superconductive wire is not as good as tests of the current-carrying capacity of the wire when placed in a free magnetic field would suggest. This degradation in performance is not generally due to previously undetected flaws in long lengths of wire, or to damage due to winding, but is probably due to subtle differences in the environment of wire sections forming part of a coil, compared with the test arrangement. It has been found that the degradation can largely be overcome by liberal copper electroplating of the superconductive wire and by forming the coated wires into cables, with copper wires between the coated wires, and sometimes with indium dipping of the cable as well.

This method of forming such a cable is, however, expensive and the object of this invention is to provide an alternative construction of cable that can be made more cheaply.

According to the invention a superconductive cable comprises one or more wires of superconductive material sandwiched between strips of pressure-weldable metal having good electrical and thermal conductivities at low temperatures and which strips have been pressure-welded together so as to embed the superconductive wire or wires in said metal and be in intimate thermal and electrical contact therewith.

It will be understood that the term pressure-welding means the joining together of metal surfaces by mutual atomic interpenetration resulting from plastic flow of metal at the surfaces under pressure applied between them without the application of heat from any external source sufficient to produce melting of the metals. Preferably no externally applied heat is used, the welding process then being that usually referred to as cold welding.

In one method of manufacturing a cable in accordance with the invention, the wire or wires of superconductive material, sandwiched between plane strips of the pressure-weldable metal, are drawn between compressive means so constructed as to allow the metal to spread under the compressive force in two dimensions in the plane of compression (i.e., transverse to the direction of the force, which force is applied at right angles to the planes of the strips) the amount of the spreading being sufficient to produce the required welding together of the strip surfaces. In some cases, welding of the metal strips to the superconductive wires might also be achieved.

Preferably the pressure-weldable metal used is aluminum, which has good electrical conductivity at low temperatures, this property being desirable so that even if in use of the cable a portion of any superconductive wire should turn temporarily normal, the current will be by-passed without too great a generation of heat. Also aluminium has a high thermal conductivity and can be applied in sufficient quantity to have a reasonable thermal capacity, these properties being desirable for enabling the metal to act as a heat sink in use and conduct away any heat generated in the region of such a normal portion as rapidly as possible and thus to prevent this portion from extending itself along the cable.

Copper is a possible alternative pressure-weldable metal for use in accordance with the invention, but in general the use of aluminium is preferred because of its smaller magneto-resistance than that of copper in the high magnetic fields encountered in the required low temperature applications, and in addition aluminium has the advantages of being more easily deformed and welded by pressure alone; it is also easier to get in pure form with low resistivity yet has the advantage of comparative cheapness since industrial aluminium may be used.

In one method of manufacturing a cable in accordance with the invention as aforesaid the compressive means used consists of squeeze rolls through which the sandwich of strips and superconductive wire is continuously drawn, the sandwich being cold welded into a composite cable on passing between these squeeze rolls.

For producing satisfactory pressure welding in this way, the plane compression must in general enlarge the area of the surfaces to be joined by a factor of 2 to 3, so that surface films, oxides, hydroxides, adsorbed or chemisorbed and residues of rolling lubricants are ruptured, allowing virgin metal on each strip to come into intimate contact to form a true metallurgical bond. For achieving this the smallest possible roll diameter should be used and the arrangement should be such as to permit the maximum degree of lateral spread of the metals to take place.

Our investigations have shown that the interfacial extension of the metal surfaces to be joined is affected by the geometry of the squeezing means, and that to obtain the maximum extension for the minimum deformation in the direction of the compressive force, the area of the deforming means should bear a direct relationship to the thickness of the materials to be welded in accordance with known cold welding techniques. Thus a method of welding alternative to the use of squeeze rolls as described is to deform the material between indenting dies having the correct surface width and area-to-metal thickness ratio using a technique of drawing the sandwich of metal strips and superconductive wire through the dies and indenting step-by-step to provide continuous lengths of welded material.

Preferably the strips on the entry side of the compressive means are tensioned on their inner surfaces, which controls lateral movement within the squeezing means and may be used to assist in the stretching of the metal and rupture of the surface films, so that virgin metal surfaces are revealed so as to cold weld more effectively upon being pressed together.

In some cases, the surfaces to be cold welded may be anodised prior to compression so as to form a particularly brittle surface layer of oxide which is more easily rupturable upon tensioning as described.

Alternatively or additionally, for achieving satisfactory cold welding the strip surfaces may be scratch brushed with a rotary wire brush prior to compression so as to reveal virgin metal and creating a strain hardened surface with light brittle oxide coating which faciiltates formation of a cold weld.

It may in some cases be desirable to coat the superconductive wire with a softer metal prior to feeding between the strips so as to enhance the thermal and electrical contact with the wires, possibly by effecting a cold welding of the strips to the wire coatings. Such coating with soft metal, which might also be of value for increasing the quantity of metal surrounding the wires, may conveniently be carried out by brush coating with a brush formed of soft metal, e.g., brass, copper alloy, nickel, which itself rubs way and adheres directly to the strands. Alternatively, a brush of hard metal (e.g., of steel) may be arranged to brush a lump of soft metal at one point of its periphery so that soft metal collects on the brush and is transferred to the wires to be coated at a further point of its periphery, thus providing an indirect coating of the wires. Other methods of coating, such as flame or plasma spraying or hot dipping may alternatively be employed.

In some cases, it might be desirable, for improving or facilitating the pressure welding, to raise the temperature of the metal strips and wire sandwich during deformtaion, either by a separate heating means or possibly by increasing the rate of strain.

After the pressure welding, the aluminium can be dissolved away at the ends of the cables to allow the wires to be connected separately as might be required in use of the cable. Alternatively, the ends of the aluminium strips can be coated with a "stopping off" agent, for example an aqueous film of graphite and calcium carbonate, which will prevent pressure welding from taking place in selected areas, allowing the aluminium strips to be separated after deformation.

Figure 2:
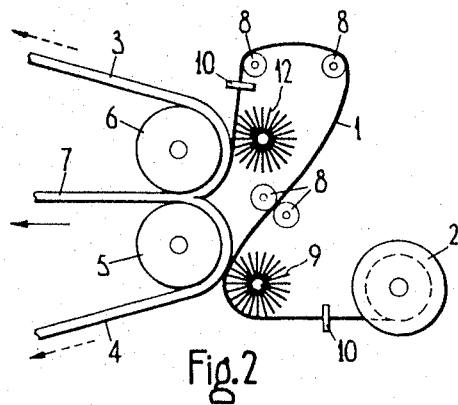
Figure 3:
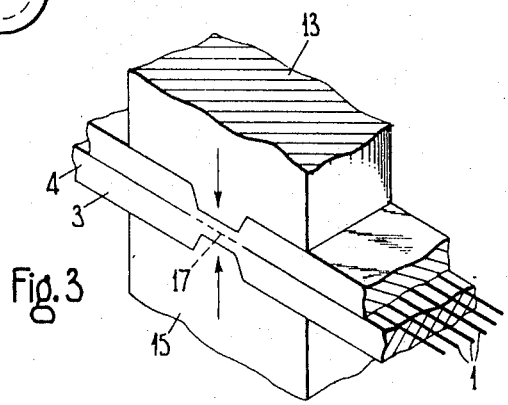
Figure 4:
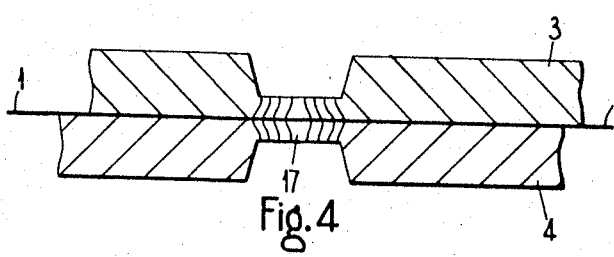
Figure 5:
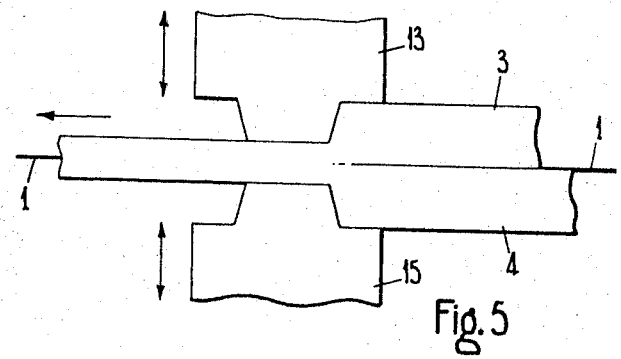
Figure 6:
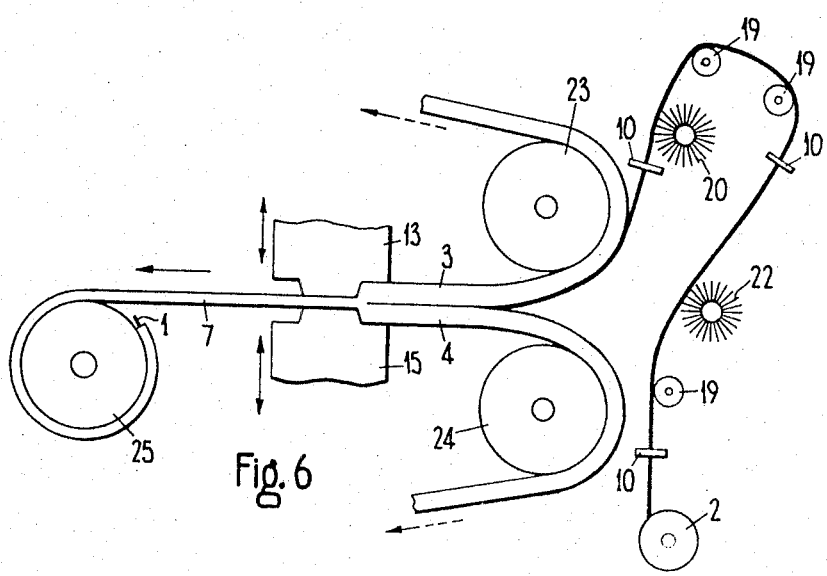

Several methods of manufacturing superconductive cables in accordance with the inventon will now be described, by way of example with reference to the accompanying drawings which are also illustrative of cables in accordance with the invention and in which:

FIGURE 1 shows a diagrammatic perspective view of cable-forming apparatus in which squeeze rollers are used as the pressure-welding means, FIGURE 2 shows a diagrammatic side elevation of apparatus similar to that of FIGURE 1 but including scratch brushes for facilitating the welding, FIGURE 3 shows a diagrammatic perspective view of apparatus illustrative of the use of an indenting rectangular die as a pressure-welding means, FIGURE 4 shows an enlarged fragmentary section across a weld formed by a single indentation of an indenting rectangular die such as shown in FIGURE 3, FIGURE 5 shows a diagrammatic side elevation of cable-forming apparatus in which an indenting rectangular die is used step-by-step as the pressure-welding means, and FIGURE 6 shows a diagrammatic side elevation of apparatus similar to that of FIGURE 1 but including scratch brushes for facilitating the welding.

Referring now to FIGURE 1, this shows a sandwich of six parallel wires 1 of niobium/zirconium alloy (75 Nb, 25 Zr), each of 0.010″ diameter spaced evenly in a plane at a separation from each other of the order of 0.015″, with strips 3 and 4 of 99.99% purity and 0.030″ thickness aluminium placed adjacent to one above and one below the wires respectively and in contact with the wires 1. The wires are drawn from spools 2 via a guide comb 10.

This sandwich is drawn continuously through the middle of a pair of horizontal squeeze rolls 5 and 6 of width somewhat greater than that of the sandwich so that cold welding of the strips to each other (and possibly also to the wires) occurs on compression at the squeeze rolls to form a unified composite superconductive cable 7 of strip form. The squeeze rolls are each of diameter about 2 to 3″ and are arranged to squeeze the sandwich with such force as to cause the aluminium strips to spread in on squeezing the two dimensions in the plane of compression, (that is along the length of the sandwich and sideways as well) so as to enlarge the area of the surface to be joined by a factor of about 2 to 3 and to produce a resultant cable 7 in the form of strip of thickness approximately 30% of the sum of the thickness of the strips 3 and 4.

FIGURE 2 shows a diagrammatic side elevtaion of an arrangement similar to that of FIGURE 1 but in which the wires 1 are drawn from the spools 2 in a tortuous path over the small pulleys 8 shown. These pulleys are so placed as to enable steel wire brushes 9 and 12 to be positioned where they can rotate so as to scratch brush those surfaces of the strips 4 and 5 which are to be welded together, thereby strain-hardening them and removing surface films, oxides, hydroxides and residues of rolling lubricants from these surfaces to reveal virgin metal for facilitating the welding. The brushes 9, 12 are also so positioned as to scratch brush the niobium/zirconium wires 1, thereby coating them to some extent with aluminium prior to them being drawn into the sandwich and through the squeeze rolls 5 and 6, which enhances the thermal and electrical contact obtained between the strips 3 and 4 and the wires 1 on passing between the squeeze rolls. A separate body of aluminium might in some cases be used, arranged to be contacted by the wire brushes 9, 12, for loading them with aluminium which is deposited on the wires 1 and/or strips 3, 4 for facilitating the welding.

On the entry side of the rolls 5 and 6 the strips 3 and 4 are strained back against the rolls by forces (as indicated by the dotted arrows shown) so as to tension and rupture any further slight oxide coating that may have formed on the surfaces of the strips 3, 4 between the time these left the brushes 9, 12 and when they pass into the squeeze rolls 5, 6, so revealing virgin metal at these surfaces immediately prior to compression and thereby further facilitating the cold-weld between the strips 3, 4.

FIGURE 3 shows a portion of a sandwich of niobium/zirconium alloy wires 1 and aluminium strips 3, 4 similar to that described for FIGURE 1 which has been subjected to a single double-sided indentation by a rectangular die having two parts 13, 15 moved together one from above and one from below the sandwich. It is important, for ensuring that the adjacent surfaces of the aluminium strips 3, 4 in the region 17 between the die parts 13, 15 are satisfactorily cold-welded together, not only that these surfaces are clean or suitably coated but that the die should have the correct width and that the ratio of the surface area of the die to the sandwich thickness should be the correct ratio found optimum for aluminium in accordance with known cold-welding techniques.

FIGURE 4 shows a fragmentary section across a localised cold-weld as might be obtained by such a single double-sided indentation using a rectangular die as described in relation to FIGURE 3. The double-sided indentation in the aluminium strips 3, 4 left on withdrawal of the parts 13, 15 of the die and the striations or flow lines of the metal in the region 17 of such a localised cold-weld are indicated.

FIGURE 5 shows a diagrammatic side elevation of an arrangement for the step-by-step cold welding of a sandwich of parallel niobium/zirconium wires laid between aluminium strips, which sandwich is as described in relation to FIGURE 1. In the arrangement of FIGURE 5 the technique of forming a single localised cold-weld by double-sided indentation (using a rectangular indenting die of the correct proportions for the particular sandwich of aluminium) is commenced at one end of the sandwich forming a localised cold-weld thereat; the parts 13, 15 are then moved outwards and the sandwich slid further between these parts 13, 15 and a further double-sided indentation and localised cold-weld formed overlapping the first. This step-by-step procedure of overlapping localised cold-welding by indentation is repeated until the whole sandwich has been cold-welded, the wires 1 being firmly embedded in and possibly themselves welded within the composite cable 7.

In a modification, which might be satisfactory for some purposes, the welds are arranged not to overlap but to be slightly spaced from each other.

The arrows beside the parts 13, 15 of the rectangular indenting die indicate their reciprocating action and the arrows beside the sandwich portion and the cold-welded cable portion 7 indicate their direction of motion.

As in the case of methods using squeeze-rolls, the methods which use a rectangular indenting die as the compressive means for effecting the welding should be arranged to produce an adequate enlargement of the area at the weld (usually by a factor of about 2 or 3) for ensuring satisfactory welding.

FIGURE 6 shows a diagrammatic side elevation of a further arrangement for the step-by-step cold welding of a sandwich as described. The arrangement of FIGURE 6 is similar to that described in relation to FIGURE 5, but in it the wires 1 are drawn from the spool 2 in a tortuous path over the small pulleys 19 prior to being drawn into the sandwich and rotating brushes 19, 20 of steel wire situated as shown, one each side of the wires are arranged to scratch brush the aluminium strips 3, 4 and wires 1 for facilitating the welding, and the thermal and electrical contact of the wires with the strips, as explained with reference to FIGURE 2.

In addition, in the arrangement of FIGURE 6, the aluminium strips 3, 4 prior to being fed into the sandwich are strained back through approximately 180° round rollers 23, 24 respectively as shown, for rupturing layers of surface oxide on the surfaces of the strips for further facilitating the welding as explained with reference to FIGURE 2.

The cable 7 formed is intermittently pulled between these reciprocating die parts as described for the arrangement shown in FIGURE 5 and is then wound upon a further roller 25 for storage.

Wires of superconductive materials other than niobium/zirconium alloy can, of course, be used in the methods as above described; for example niobium/titanium alloy may be preferred in some cases because of its higher critical field.

We claim:

1. A method of making a superconductive cable, said method comprising:
   (A) leading a pair of plane strips of pressure-weldable metal having good electrical and thermal conductivities at low temperatures into mutual contact with the broad surfaces thereof in juxtaposition,
   (B) leading through guide means wires consisting of superconductive alloy material, said wires being led to the zone of contact between said strips,
   (C) compressing said strips against one another with the wires between them so as to apply a force substantially perpendicular to the planes of said broad surfaces and to form opposed grooves in said plane surfaces in which said wires are embedded, said metal being spread by such compression in two dimensions in the plane of each strip,
   (D) the amount of compression and spreading being sufficient to effect the pressure-welding together of the strips.

2. A method according to claim 1, in which the said compressive means consists of squeeze rolls through which the sandwich is drawn.

3. A method according to claim 1, in which the said compressive means consists of an indenting rectangular die having two parts between which the strips are drawn step-by-step and which die parts are periodically moved towards and away from one another in synchronism with the strip movements so as to effect step-by-step pressure-welding of the strips with embedding of the wires in the welded parts of the strips.

4. A method according to claim 1, in which the strips on the entry side of the compressive means are back-tensioned upon their inner surfaces so that surface films on them are ruptured, allowing virgin metal on each strip to come into intimate contact upon passage through the compressive means to facilitate the welding of the strips.

5. A method according to claim 1, in which the strip surfaces are scratch-brushed prior to passage through the said compressive means so as to reveal virgin metal and create a strain-hardened surface with light brittle oxide coating which facilitates the formation of a pressure-weld.

6. A method according to claim 1, in which the superconductive wire prior to being sandwiched between the metal strips and passed through said compressive means is coated with a softer metal so as to enhance the thermal and electrical contact of the metal with the wire in the end product cable passed from the compressive means.

7. A method according to claim 6, in which the strips are of aluminium and scratch-brushed prior to passing through the compressive means so that the scratch-brushing transfers aluminium from the strips on to the superconductive wire.

8. A method according to claim 1, in which the metal sandwiching strips are of aluminium and the superconductive wire is of niobium/titanium alloy.

9. A method according to claim 1, in which the metal sandwiching strips are of aluminium and the superconductive wire is of niobium/titanium alloy.

References Cited

UNITED STATES PATENTS

| 3,201,862 | 8/1965 | Gotoh | 29—470.1 |
| 3,306,972 | 2/1967 | Laverick et al. | |
| 3,309,179 | 3/1967 | Fairbanks. | |

OTHER REFERENCES

American Institute of Physics Handbook, 2nd edition, McGraw-Hill, N.Y., 1963, pp. 9–112.

E. A. GOLDBERG, *Primary Examiner.*

U.S. Cl. X.R.

29—470.1; 174—126, 128